2,961,375
NONTOXIC FUNGICIDAL PREPARATIONS

Charles G. Shaw, % Shaw Research, Omemee, Ontario, Canada

No Drawing. Filed Aug. 27, 1957, Ser. No. 680,626

5 Claims. (Cl. 167—58)

This invention relates to fungicidal or mycostatic chemotherapeutic agents of low toxicity. More specifically it concerns therapeutic preparations in which the active material essentially comprises a halide substituted compound of the aromatic derivatives of phenol and a suitable acid buffer.

It is well known in the art to treat such materials as leather and wood with a saturated or unsaturated halide substituted compound of phenol, such as pentachlorophenol, to inhibit the growth of molds and other fungi therein. Such substances, however, have not been used medicinally with complete success principally because of their toxicity and/or the high sensory reaction they induce, and because they are practically insoluble in water. Solubility is an important requirement for disinfectants and the like.

An object of the invention is the provision of chemical means whereby such substances can be used medicinally. Other objects will become apparent in the description hereafter and the claims appended thereto.

It has been discovered that the saturated and/or unsaturated halide substituted compounds of phenol can be used with safety and with no undesirably high sensory reaction when combined with a compound from the group consisting of phthalic acid and chloro-substituted derivatives thereof.

It is not known why this combination precludes a toxic or sensory reaction. However, it is believed that sensory reaction is ordinarily due to a reaction of the phenol, for example pentachlorophenl, with amines or amino acids in the body tissues. In an unbuffered solution at approximately 6.5 pH, the substances react to form a soluble salt of the phenol compound which at sufficient concentration becomes increasingly toxic. The resultant pentachlorophenol sodium or other-alkali salt has a pH of ±10—considerably higher than the body pH of 7.3. Such a high pH is indicative of high solubility and toxicity. The addition of phthalic acid or other acidic buffer to the solution, on the other hand, holds the pH down and prevents the formation of the more soluble salts. Moreover, amine groups apparently have a greater affinity for phthalic acid than the phenol group, perhaps because phthalic acid is more highly ionized. In any case, it is thought that the amine groups prefer to react with the phthalic acid rather than the phenol and accordingly the phenol retains its non-toxic acidic characteristic. The acid used shall be referred to hereafter as the buffering acid or agent.

While pentachlorophenol has been found to be very desirable as a mycostatic agent, it is also true that the less saturated halogen-substituted phenols can be used in certain cases. The more saturated with the halide, the less water soluble—and consequently the less toxic—is the phenol. Tetrachlorophenol approaches the least saturated compound which is satisfactory without complicated buffering, although trichlorophenol can be used to a limited extent in combination with more highly saturated phenols.

It is also true that halides other than chlorine can be substituted, although the chlorine substituted compound in certain respects is most desirable. The bromine substituted compound is less satisfactory in that it may have an objectionable odor. It can however be used satisfactorily as a dusting powder. The iodine substituted compound stains badly, and therefore is not as desirable as pentachlorophenol. Furthermore, it is somewhat more soluble and accordingly is more toxic in some applications. Fluorine is difficult to substitute in some positions around the ring and has a tendency to be unstable. All of these halide substituted compounds mentioned secondarily above are valuable and have been tried successfully as medicaments, but are not preferred for the reasons set forth.

The mycostatic halide substituted compounds of the phenols together with their buffering agents shall be referred to as active agents. These active agents have many applications to all parts of the body. For example, they are useful in treating such mycostatic infections as athletes foot, certain oral disorders mentioned hereafter, and dandruff.

Each particular application requires a suitable vehicle or solvent for applying the active agent in the most effective manner to the area being treated.

In most applications, a wetting agent forms an important part of the vehicle in order to bring the active agent into intimate contact with the organism in the tissue. Either an anionic or a non-ionic compound may be used as the wetting agent. A non-ionic wetting agent is preferred in nasal sprays and the like, while an anionic wetting agent is preferred where high attachment is desired since anionic agents appear to have a high affinity for the corium and eipithelial tissue.

As a further part of the vehicle, common solvents are used since they are comparatively insoluble in water. The alcohols are desirable solvents in that they appear to be selectively absorbed or diffused by the tissues, thus precipitating out the active agent at the desired zone of treatment.

Where the preparation is required for the prophylaxis of a surface and as a diffusible therapeutic to reach down into the subcutaneous corium layers of the skin, it preferably has an impermanent characteristic of solubility-stability. By raising the alcohol content and lowering the wetting agent proportion and thus lowering the aqueous solubility and diffusibility of the fungicide this characteristic can be acquired. Where an extreme in this respect is desired pentabromophenol and terephthalic acid can be used.

The products according to the invention thus embody a system having first, a fungicidal or mycostatic agent of low aqueous solubility; second, an acidic buffering agent; third, a surface active wetting agent and/or suitable solvent for the first and second ingredients; and fourth, where desirable, varying amounts of water to provide stable or critical solution equilibrium as circumstances may indicate. By adjusting the third component and the water content, the first and second components will either remain stably in solution or precipitate out in a critical zone during application.

A large number of phenolhalides have been studied and their characteristics utilized within the scope of the invention. Pentabromophenol, pentachlorophenol, and 3,5-dichloro-2,4,6-tribromophenol are examples of some of the pentahalogenated phenols used and apparently because of the penta substitution as compared to the tetra, tri- or di-substituted halides, they are less toxic and less likely to induce allergy. However, many compounds of the tetra and tri-substituted phenols are useful, such as 2,3,4,5-tetrachlorophenol, 2,4,6-trichlorophenol, and 2,4,5-trichlorophenol. Also the mixed halides, 6- chloro-2, 4-dibromophenol and 2,6-dichloro-4-bromophenol, are very effective, as is 2,4,6-tribromophenol. The presence of bromine in the phenolic halide, as compared to chlorine, has the effect of lowering its water solubility and volatility as well as the toxicity factor thereof.

Similarly, a large number of chlorosubstituted derivatives of phthalic acid have definite mycocidal properties and act not only as acidic buffering agents but to enhance the mycostatic effect of phenolhalides such as pentachlorophenol. In many instances they are sufficiently active fungicides to act as the primary mycostic controlling element of the preparation. The mono, di and tetrachlorophthalic acids apparently increase in mycocidal potency and decrease in incidence of sensory reaction and toxicity as the chlorine-substitution products approach full chlorination; the fully halogen-substituted products are generally preferred as being generally more stable.

Phosphates such as di-calcium phosphate and acid sodium pyrophosphate can be compounded with phthalic acid, chlorophthalic acid and/or chlorophenol to provide useful preparations as fungicides for organisms associated with pyorrhea and gingivitis which abhor low pH conditions, and against which the high chloro-substitution proportion of the compounds is most effective. The complex buffering system is not sufficiently acidic to affect the tooth enamel deleteriously.

An example of a preparation for the relief of heavy calluses, corns, and nails which may be myco-infected is the following where the percentages are by weight:

Example 1

| | Percent |
|---|---|
| Pentachlorophenol | .15 |
| Tetrachlorophenol | .05–.1 |
| Phthalic acid | 2.0 |
| Ethyl alcohol | 20. |
| Sodium lauryl sulfate | .25 |
| Water to make a hundred parts. | |

The following is an example of a therapeutic agent having limited penetration but high surface activity and continuing prophylactic effect for the control of gingivitis and periodontal affections, the percentages being by weight:

Example 2

| | Percent |
|---|---|
| Polyethylene glycol (6000 M.W.) | 6.75 |
| Polyethylene glycol (4000 M.W.) | 20.25 |
| Diethylene-glycol-monoethyl-ether | 12. |
| Glycerine glycerol | 4. |
| Sodium lauryl sulfate (Duponol C) | 4.5 |
| Phthalic acid | 2.5 |
| Pentachlorophenol | .3 |
| Dicalcium phosphate | 43. |
| Water | About 6.7 |
| Saccharin, oil cassia, oil cloves | (Q. S.) |

The phthalic acid and dicalcium phosphate form a complex which firstly effectively buffers the pentachlorophenol and secondly controls the pH, lowering it sufficiently to regulate the aqueous diffusion of soluble pentachlorophenate salts but maintaining it at a level satisfactory for periodontal applications.

An example of a mouth wash utilized for periodontal lesions follows in percentages by weight:

Example 3

| | Percent |
|---|---|
| Ethyl alcohol (95%) | 12. |
| Sodium lauryl sulfate | .6 |
| Pentachlorophenol | .1 |
| Phthalic acid | 2. |
| Sodium hydroxide | .5 |
| Water to make a hundred parts | 85. |
| Saccharin, oil cassia, oil cloves | (Q. S.) |

To minimize deleterious effects on the tooth enamel, sodium hydroxide about quarter neutralizes the phthalic acid, producing in the finished solution a pH of about 4.5. The aqueous solvency of the acid is thereby increased, requiring a higher proportion relative to the pentachlorophenol than would otherwise be adequate.

It is obvious that in the above formulation tetrachlorophthalic acid can be employed advantageously in the place of phthalic acid where organisms of the cocoid or motile spore type in cellular debris indicate a predominance of this pleomorph in the affected tissue, particularly in the dressings. Tetrachlorophthalic acid tends to slow hydrogen ion activity, resulting in increased synergistic mycostatic effectiveness. Also terephthalic acid, having a lower solubility, is a good buffering acid in preparations having low concentrations of the solvent.

A semi-styptic solution applicable for the treatment of periodontal lesions is exemplified in the following:

Example 4

| | | |
|---|---|---|
| Ethyl alcohol (95%) | percent by volume | 40. |
| Phthalic acid | percent by weight | 1.5 |
| Sodium hydroxide | do | .184 |
| Sodium lauryl sulfate | do | .4 |
| Pentachlorophenol | do | .2 |
| Water | do | 60. |

The following is a further example in percentages by weight:

Example 5

| | Percent |
|---|---|
| Polyethyleneglycol monolaurate (600 M.W.) | 30. |
| Propylene glycol | 20. |
| Monosodium tetrachlorophthalate | 1.5 |
| Boric acid | 1.5 |
| Pentachlorophenol | .05 |
| Water | About 47. |

A compound for nasal and simus applications is exemplified by the following percentages by weight:

Example 6

| | Percent |
|---|---|
| Lanolin anhydrous | 25. |
| Ethyl alcohol (95%) | .75 |
| Pentachlorophenol | .015 |
| Phthalic acid | .1 |
| Duponol C | .05 |
| Sodium hydroxide | .025 |
| Mineral oil | 50. |
| Water | About 25. |

In this example it will be noted that the o-phthalic acid is partially neutralized with sodium hydroxide as a means of buffering the pH to a level at which the pentachlorophenol and acid sensory reaction is reduced.

A further application for optical therapy is exemplified in the following percentages by weight:

Example 7

| | Percent |
|---|---|
| Polyethyleneglycol mono-oleate (1500 M.W.) | 20. |
| Polyethylene glycol (1500 M.W.) | 10. |
| Propylene glycol | 10. |
| Monosodium tetrachlorophthalate | 1.5 |
| Pentachlorophenol | .01 |
| Boric acid | 2. |
| Sodium chloride | .25 |
| Water | About 55. |

The application below is advantageously substituted for toilet soap, percentages being by weight:

Example 8

| | Percent |
|---|---|
| Sodium-sulfated stearine | 57. |
| Sodium glyceryl monolaurate sulfate | 24. |
| Pentachlorophenol | 1. |
| O-phthalic acid | 2. |
| Boric acid | 2. |
| Water and inert matter | 14. |

A further example of a mycostatic detergent for very delicate skins and infants' use is seen below in percentages by weight:

Example 9

| | Percent |
|---|---|
| Lanolin | 20. |
| Sodium lauryl sulfate | 60. |
| Boric acid | 10. |
| Pentachlorophenol | .1 |
| Tetrachlorophthalic acid | .5 |
| Water and inert matter | 9.4 |

A formulation applicable for the treatment of hermorrhoids, which in my hypothesis are associated with a fungus infection, is acquired in the following percentages by weight:

Example 10

| | Percent |
|---|---|
| Lanolin anhydrous | 50. |
| Ethyl alcohol (95%) | 1.5 |
| Pentachlorophenol | .025 |
| Phthalic acid | .2 |
| Duponol C | .1 |
| Sodium hydroxide | .05 |
| Water | About 48. |

Use can be made of the products herein in other parts of the anatomy than those mentioned; for instance, preparations applicable to the nasal passages can be employed as a douche or pack for vaginal infections; and similarly, for infections of the colon and rectum a therapeutic similar to the nose drops or the mouth wash formulation can be employed.

Although the invention has been described in considerable detail with reference to certain preferred embodiments thereof, it will be understood that variations and modifications can be effected without departing from the spirit and scope of the invention as described hereinabove and as defined in the appended claims.

I claim:

1. A therapeutic mycostatic preparation essentially comprising about 0.01–1.0% by weight of a compound from the group consisting of tri-halo, tetra-halo, and penta-halo substituted derivatives of phenol, about 0.1–2.5% by weight of a compound from the group consisting of phthalic acid and its chloro-substituted derivatives, and a therapeutically acceptable carrier.

2. A therapeutic mycostatic preparation according to claim 1 further comprising a compound from the group consisting of non-metallic inorganic salts and hydroxides of the alkaline earth and alkali metals.

3. A therapeutic mycostatic preparation according to claim 1 wherein said last-named compound is phthalic acid.

4. A therapeutic mycostatic preparation according to claim 3 wherein said first-named compound is pentachlorophenol.

5. A therapeutic mycostatic preparation according to claim 1 wherein said last-named compound is a chloro-substituted derivative of phthalic acid.

References Cited in the file of this patent

UNITED STATES PATENTS

| 1,879,351 | Lehmann | Sept. 27, 1932 |
| 1,981,123 | Roche | Nov. 20, 1934 |
| 2,191,405 | Hueter | Feb. 20, 1940 |

OTHER REFERENCES

Stohlman: Public Health Reports, vol. 66, No. 41, Oct. 12, 1951, pp. 1303–1317.

Peck: Public Health Reports, vol. 58, No. 9, Feb. 26, 1943, pp. 338–339.

Schwartz: J.A.M.A., Sept. 14, 1946, vol. 132, No. 2, pp. 60–61.

Walker: J.A.P.A., Sci. ed., vol. XLI, No. 2, February 1952, pp. 77–79.